US006995853B1

(12) United States Patent
Bratsanos et al.

(10) Patent No.: US 6,995,853 B1
(45) Date of Patent: Feb. 7, 2006

(54) METHOD AND SYSTEM FOR MODIFYING PRINT STREAM DATA TO ALLOW PRINTING OVER A SINGLE I/O PORT

(75) Inventors: James S. Bratsanos, Seattle, WA (US); Daniel J. Clemens, Deer Harbor, WA (US); Victor Girardi, Oxford, CT (US); Patrick Rolling, Cheshire, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/541,001

(22) Filed: Mar. 31, 2000

(51) Int. Cl.
*G06F 15/00* (2006.01)
*G06K 1/00* (2006.01)

(52) U.S. Cl. .................... 358/1.15; 358/1.15; 358/462; 101/91

(58) Field of Classification Search .............. 358/1.11, 358/1.12, 1.13, 1.14, 1.15, 1.16, 462; 101/91
See application file for complete search history.

(56) References Cited

U.S. PATENT DOCUMENTS

| | | | |
|---|---|---|---|
| 4,858,907 A | 8/1989 | Eisner et al. ................ 271/124 |
| 4,875,174 A | 10/1989 | Olodort et al. ............. 715/507 |
| 4,915,287 A | 4/1990 | Volk et al. ..................... 229/70 |
| 5,007,663 A | 4/1991 | Moran ........................... 283/81 |
| 5,146,439 A | 9/1992 | Jachmann et al. ....... 369/25.01 |
| 5,175,691 A | 12/1992 | Baker et al. ................ 700/220 |
| 5,278,947 A | 1/1994 | Balga et al. ............... 358/1.18 |
| 5,319,562 A | 6/1994 | Whitehouse ................ 705/403 |

(Continued)

FOREIGN PATENT DOCUMENTS

DE 9219115 U1 3/1998

(Continued)

OTHER PUBLICATIONS

"Hands-On StreamWeaver® Learning Guide" Release 4.0, 1997, PDR Advanced Technology, A Pitney Bowes Company.

(Continued)

*Primary Examiner*—David Moore
*Assistant Examiner*—Thierry L. Pham
(74) *Attorney, Agent, or Firm*—Ronald Reichman; Angelo N. Chaclas

(57) ABSTRACT

The invention is a method and system of modifying print stream data. The method begins by sending a print stream from an application through a graphical device interface to a print spooler. A print stream monitor determines whether or not the print stream comprises a set of text data and/or a set of address data. If the print stream comprises text data, then the text data is tagged and sent to a user mode module where it is stored in a local buffer. The tagged and stored text data is then retrieved and parsed for any address which may be contained within the tagged text. The address data is then extracted from the print stream and placed in an envelope print format to create an envelope data set. An envelope printer device context is then created and the envelope data set is transmitted to an envelope kernel for creating an envelope printer device language file. The print stream is converted by a document printer command language (PCL) generator into an envelope printer language. The envelope data set is then printed. The envelope data set is injected back into the print stream from which it was extracted by merging the set of text data and the set of envelope data. The print stream is then transmitted to a next destination such as a document printer, where a printer driver is then activated for causing a printer to print the document data to one or more sheets.

10 Claims, 5 Drawing Sheets

U.S. PATENT DOCUMENTS

| | | | |
|---|---|---|---|
| 5,326,181 A | 7/1994 | Eisner et al. | 400/106 |
| 5,387,783 A | 2/1995 | Mihm et al. | 235/375 |
| 5,400,243 A | 3/1995 | Oheda et al. | 715/531 |
| 5,448,685 A | 9/1995 | Ogura et al. | 358/1.18 |
| 5,495,581 A | 2/1996 | Tsai | 715/526 |
| 5,546,577 A | 8/1996 | Marlin et al. | 707/103 R |
| 5,579,449 A | 11/1996 | Strobel | 358/1.11 |
| 5,583,970 A | 12/1996 | Strobel | 358/1.15 |
| 5,606,609 A | 2/1997 | Houser et al. | 713/179 |
| 5,621,864 A | 4/1997 | Benade et al. | 358/1.18 |
| 5,628,249 A * | 5/1997 | Cordery et al. | 101/91 |
| 5,652,884 A | 7/1997 | Palevich | 713/1 |
| 5,657,431 A | 8/1997 | Plakosh et al. | 358/1.16 |
| 5,668,934 A | 9/1997 | Maw | 358/1.11 |
| 5,668,964 A | 9/1997 | Helsel et al. | 715/776 |
| 5,668,990 A | 9/1997 | Bajorinas et al. | 707/104.1 |
| 5,680,615 A | 10/1997 | Marlin et al. | 700/103 R |
| 5,681,468 A | 10/1997 | Sawan et al. | 210/500.25 |
| 5,682,468 A | 10/1997 | Fortenbery et al. | 345/419 |
| 5,684,706 A | 11/1997 | Harman et al. | 700/95 |
| 5,684,934 A | 11/1997 | Chen et al. | 358/1.14 |
| 5,689,703 A | 11/1997 | Atkinson et al. | 707/103 R |
| 5,694,563 A | 12/1997 | Belfiore et al. | 715/821 |
| 5,696,914 A | 12/1997 | Nahaboo et al. | 715/763 |
| 5,706,458 A | 1/1998 | Koppolu | 715/810 |
| 5,710,900 A | 1/1998 | Anand et al. | 715/764 |
| 5,715,371 A | 2/1998 | Ahamed et al. | 706/10 |
| 5,717,597 A | 2/1998 | Kara | 705/408 |
| 5,719,776 A | 2/1998 | Haug | 705/411 |
| 5,848,186 A * | 12/1998 | Wang et al. | 382/176 |
| 5,869,824 A | 2/1999 | Okada et al. | 235/380 |
| 6,030,132 A | 2/2000 | Harman et al. | 400/62 |
| 6,337,743 B1 * | 1/2002 | Brown et al. | 358/1.13 |

FOREIGN PATENT DOCUMENTS

| | | |
|---|---|---|
| EP | 0 496 575 A2 | 7/1992 |
| EP | 0 780 803 A2 | 6/1997 |
| WO | WO 97/141117 | 4/1997 |

OTHER PUBLICATIONS

"StreamWeaver® Language Reference" Release 4.0, 1997, PDR Advanced Technology, A Pitney Bowes Company.

* cited by examiner

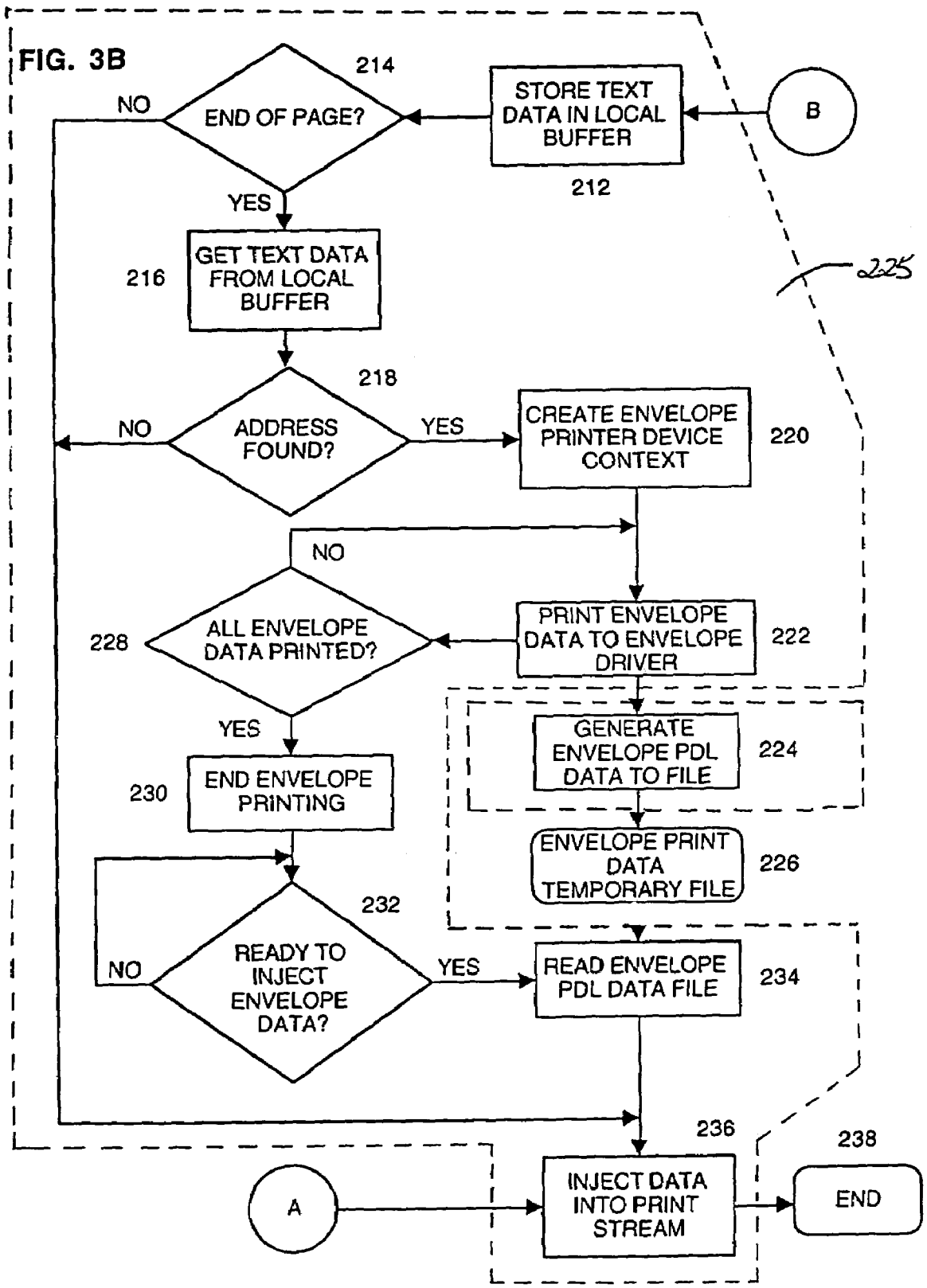

METHOD AND SYSTEM FOR MODIFYING PRINT STREAM DATA TO ALLOW PRINTING OVER A SINGLE I/O PORT

RELATED APPLICATIONS

Reference is made to application Ser. No. 09/119,463, entitled A METHOD AND SYSTEM OF DISPLAYING DATABASE CONTENTS IN ENVELOPE DATA FIELDS, assigned to the assignee of this application and filed on Jul. 20, 1998.

Reference is made to application Ser. No. 09/119,183, entitled A METHOD AND SYSTEM OF PRINT STREAM ADDRESS EXTRACTION, assigned to the assignee of this application and filed on Jul. 20, 1998.

Reference is made to application Ser. No. 09/119,464, entitled A METHOD AND SYSTEM OF PRINTING A POSTAGE INDICIA FROM AN ENVELOPE DESIGN APPLICATION, assigned to the assignee of this application and filed on Jul. 20, 1998.

Reference is made to application Ser. No. 09/119,462, entitled A METHOD AND SYSTEM FOR CAPTURING DESTINATION ADDRESSES FROM LABEL DATA, assigned to the assignee of this application and filed on Jul. 20, 1998.

Reference is made to application Ser. No. 09/461,575, entitled a SYSTEM FOR ADDING SOFT FONTS TO A PRINTER DATA STREAM, assigned to the assignee of this application and filed on Dec. 15, 1999.

FIELD OF THE INVENTION

The present invention relates generally to the field of print stream data processing; and, more specifically, to the field of printing to multiple device drivers via a single print stream input.

BACKGROUND OF THE INVENTION

Mail preparation systems, such as the DOCUMATCH™ mail processing and finishing system available from Pitney Bowes Inc. of Stamford, Conn., establish a mail piece print run at a host personal computer (PC) and then direct the stream to printer peripherals for printing to an envelope and/or to a page substrate. Mail preparation systems are an example of systems whose purpose is to utilize address lists, perform addressing hygiene through the use of address correction techniques, assign barcoding and, download data to addressing printers, collators, sealers, and the like, for the purpose of producing a mailpiece. These systems sometimes have only a single input/output (I/O) port interface between the PC and the document printer. Thus, the current mail preparation systems are generally constrained by their printer hardware architecture.

To support such a system architecture, the application print data stream must be altered to allow the generation of envelope print data streams and its re-injection into the main application print stream. The creation of the envelope print stream involves the capture of text data contained in the document to generate the envelope, the use of an envelope definition module, and the use of proprietary print protocol language for the mail preparation system to direct the data to an appropriate printer.

The print stream created by the main application is generally in the form of text data, though it may take on other forms. The data may be parsed and checked before format correction and barcoding techniques can be directed to the addresses in the text for creation of a mailpiece.

Mailpiece production systems are known in the art and have developed with changes in postal service regulations (such as those of the United States Postal Service, or USPS) and with the proliferation of appropriate software applications. In turn, this production has served the need to automate and accelerate to accommodate growth.

As the United States Postal Service (USPS), together with the postal services of other countries around the world, moves toward more fully automated mail handling in an effort to contain costs while processing ever increasing volumes of mail, automated equipment which sorts and processes mail on the basis of machine readable postal codes, such as the "zip code" or other forms of postal coding, play an ever more significant role. In the United States, postal service regulations provide for a "Postnet" bar code which represents the five, nine, or eleven digit zip code of the destination address in a machine readable form. 4-State can be utilized within Canada.

Additionally, a system for printing envelopes with addresses including bar code is disclosed in commonly assigned U.S. Pat. No. 5,175,691 for a SYSTEM AND METHOD FOR CONTROLLING AN APPARATUS TO PRODUCE ITEMS IN SELECTED CONFIGURATIONS; issued on Dec. 29, 1992 to Baker et al. (hereinafter referred to as Baker), which describes a system for printing mail pieces which includes a printer for printing sheets and envelope forms and a folder-sealer mechanism for folding the envelope form around the sheets to form a mail piece, and a computer based control system for controlling the printer and folder. In the system of this application, when an operator is creating a file of letters to be printed, the operator may designate a selected field within each letter as containing the destination address. The system will then extract the information in this designated field and with it create a new page of material to be printed on the envelope form; and, if the address within the designated field includes a zip code, the system will add a corresponding barcode to the new page. The system then adds this new page to the file before the file is output.

The ability to structure software coding is extremely important when linking data to be downloaded to a printer being utilized in the addressing environment. U.S. Pat. No. 5,583,970 for a PRINTER COMMAND SET FOR CONTROLLING ADDRESS AND POSTAL CODE PRINTING FUNCTIONS, issued Dec. 10, 1996 to Strobel (hereinafter referred to as Strobel), and assigned to the assignee of the present claimed invention, is instructive in this respect.

Strobel is a method and system for printing images to a substrate wherein the commands normally input by an operator, or resident within the printer, can be determined at a host data processor. The system can control address and postal code printing functions beginning at the host computer together. The system will derive printing data, including address data, from a selected application resident in the host computer. The host computer creates and then transmits printer command sets and printing data, via transmitting means to a microprocessor within the printer. The microprocessor drives a language interpreter which directs the printer commands to a parsing step for determining the address location from within the data to be printed. The language interpreter then assigns delivery point digits to a zip code that was isolated from the transmitted address data. The newly created zip code is then matched with the bar code data stored within the microprocessor's corresponding memory. A bar code corresponding to the new zip code is selected. The language interpreter then directs the printer's controller to prepare to print the address with its corresponding zip code, any graphics images that may have been included within the print data, and text, if any. The printer controller positions the bar code for printing, and then prints the bar code and address data, zip code, and any graphics images and text to an envelope or other substrate.

A particular limitation to current methods and systems, however, is found in the assembly of the envelope print stream which fuels the prior art detailed above. Mailpiece production systems having two separate printers and a single I/O port are constrained by the serial connection between their printers, making it impossible for the document printer to query information directly from its corresponding envelope printer. Therefore, as is illustrated by FIG. 2 hereinbelow, these mailpiece preparation systems must integrate two drivers while exposing only one to the application.

Therefore, it is an object of the present invention to provide for a method and system for determining and extracting an address from a print stream. Additionally, it is an object of the present invention to generate new print streams by printing to a secondary driver, reading the secondary print streams and injecting the secondary print stream back into the primary application print stream associated with a single I/O port connecting the mail preparation system to its host PC.

SUMMARY OF THE INVENTION

The invention is a method and system of modifying print stream data in a printing system having at least two printers and a single input/output port and comprises a number of steps and components.

The method begins by sending a print stream from a data processing application through a graphical device interface (GDI) to a print spooler to form a GDI print stream. The GDI print stream may contain: control data with a corresponding control page wizard which is utilized to facilitate mail merge functionality within the printing system; text data; address data; and/or, some other components. The data processing application can be a mailpiece designer application for preparing a mailpiece based on assigned parameters. Additionally, the mailpiece designer application is capable of presenting a data entry screen to a system user for performing the further steps of creating and/or modifying a mailpiece definition file and, storing and/or retrieving one or more mailpiece definition files wherein each of the files corresponds to a specific mail print run. In a preferred embodiment, the document designer application is a 32-bit WINDOWS automation server.

The printing system employs a print stream monitor within a document driver kernel context for scanning the GDI print stream to determine whether or not the print stream comprises a set of text data and/or a set of address data. If the print stream comprises text data then the text data is tagged and sent to a user mode module; however, if the print stream does not comprise text data, then the print stream is sent directly to a data injection step. After tagging, the text data is stored in a local buffer. The tagged text stored in the local buffer cannot be retrieved until the stored tagged text has received an end of page control mark for the text sought to be retrieved.

The tagged and stored text data is then retrieved from the local buffer and it is determined as to whether or not an address is contained within the tagged text. The determination is made by an envelope parser for detecting, parsing, and then extracting address data from the print stream. If an address is found in the tagged text, then the address is placed in an envelope print format to create an envelope data set; however, if an address is not found, then the tagged text is sent directly to the data injection step. An envelope printer device context is then created and the envelope data set is transmitted to an envelope kernel for creating an envelope printer device language file.

The GDI print stream is converted by a document printer command language (PCL) generator into an envelope printer language. The envelope data resulting is then utilized by a second designer application for displaying a set of data fields of the envelope data to a system user, reading a set of parameters created by the second designer application; and, writing the envelope data to a printer driver. The envelope data set is then printed.

Upon printing the envelope data set, the printer device language is then read by the print stream monitor which is used to modify the print stream by taking the envelope data set and injecting it back into the print stream from which it was extracted by merging the set of text data and the set of envelope data. The print stream is then transmitted to a next destination such as a document printer where a control page parser for detecting, parsing, and then extracting the document data from the print stream is employed. A printer command language (PCL) generator for converting the print stream into a document printer language is then employed. A printer driver is then activated for causing a printer to print the document data to one or more sheets.

BRIEF DESCRIPTION OF THE DRAWINGS

FIG. 3B is a continuation of the flowchart of the method of the present invention beginning with the document driver user mode module and concluding with the re-injection of data into the print stream.

DETAILED DESCRIPTION OF THE PREFERRED EMBODIMENTS

The system concept and architecture describes the method and system required to print a mail piece run as defined by a user from a WINDOWS® application document and/or an address list to system printer. The printing application can be, but is not limited to, a word processor application and a mail list management or database application. Consequently, the system requirements include: the interception of the print stream data from the documents being printed; parsing and extraction of certain information from the print stream data; adding information into the print stream data to generate a finished mail piece from the document being printed; and, converting the graphical device interface (GDI) print stream into a printer language print stream.

The following detailed description of the preferred embodiments presents the system requirements in context.

Figure 1:
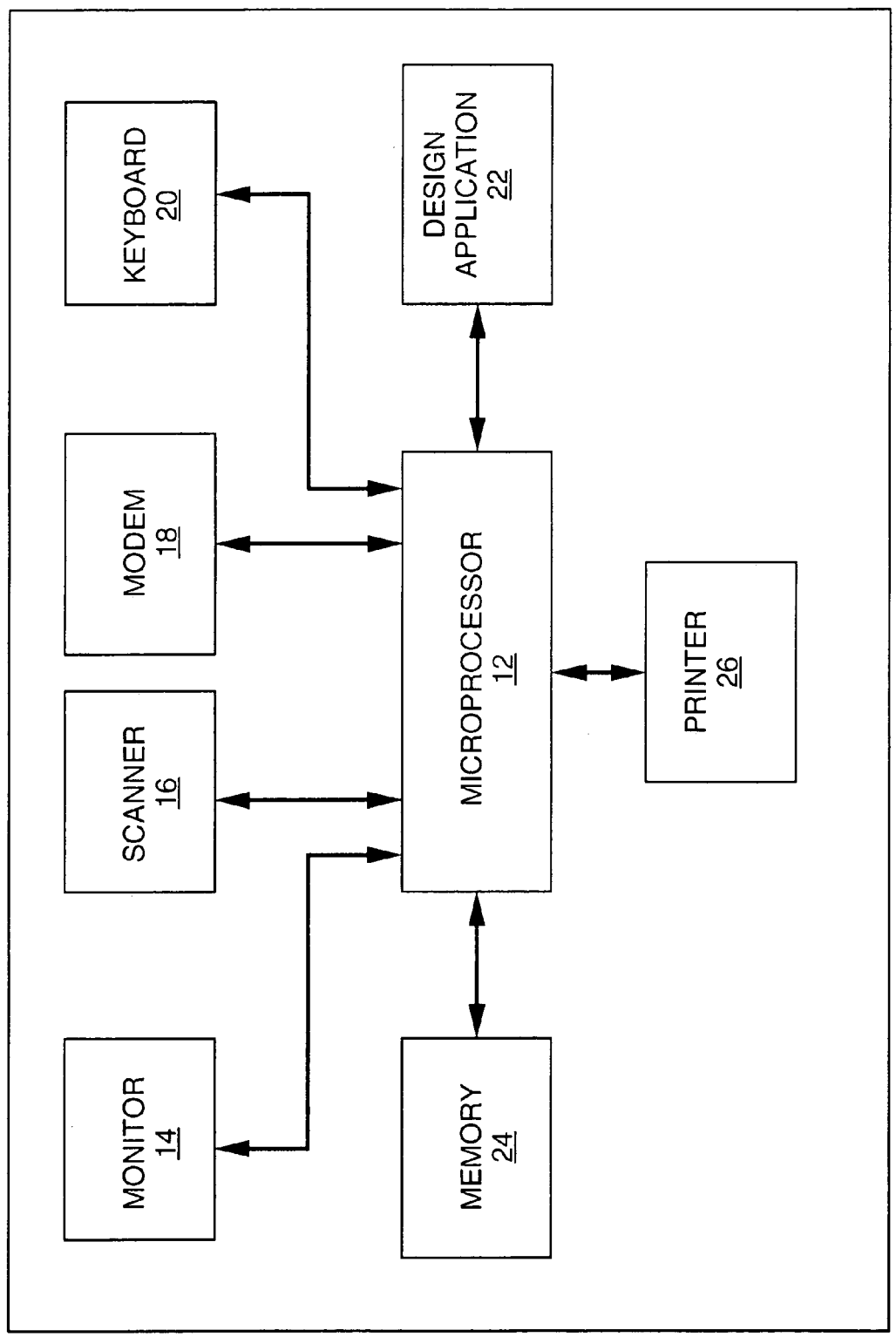
FIG. 1 is a block diagram of a system within which the method of the present invention could reside and be utilized.

Turning to FIG. 1, there is shown a block diagram of a system within which the method of the present invention could reside and be utilized.

System 10 comprises a microprocessor 12 interoperatively connected to monitor 14 for viewing the representation of the medium (such as an envelope or label) to be acted upon by the design application 22. The viewing of the media representation on monitor 14 promotes ease of use in selecting the various options available to the system user while formatting the medium, and provides an example of the human interface that can be brought to system 10. The monitor 14, under control of the design application 22, is able to show the system user: the medium representation; available menus from which option selections may be made; the medium's indicia; the amount of postage that will be incorporated into the indicia; and varied print fields available for printing to the selected medium. Microprocessor 12 is interoperatively connected to scanner 16. Scanner 16 provides system 10 with the ability to scan address field data, barcodes, or other scannable data sources as an input to design application 22. Printer 26 is also interoperatively connected to microprocessor 12 and serves as the output device by which the print fields are printed to the selected medium. Additionally, keyboard 20 is interoperatively connected to microprocessor 12 and serves as an input device for the input of data. Modem 18 gives system 10 the ability to communicate with other systems via communications means of varied types or to download print fields for remote storage; and, memory 24 allows the system to retain data for use in maintaining records or for storing data for future use.

Figure 2:
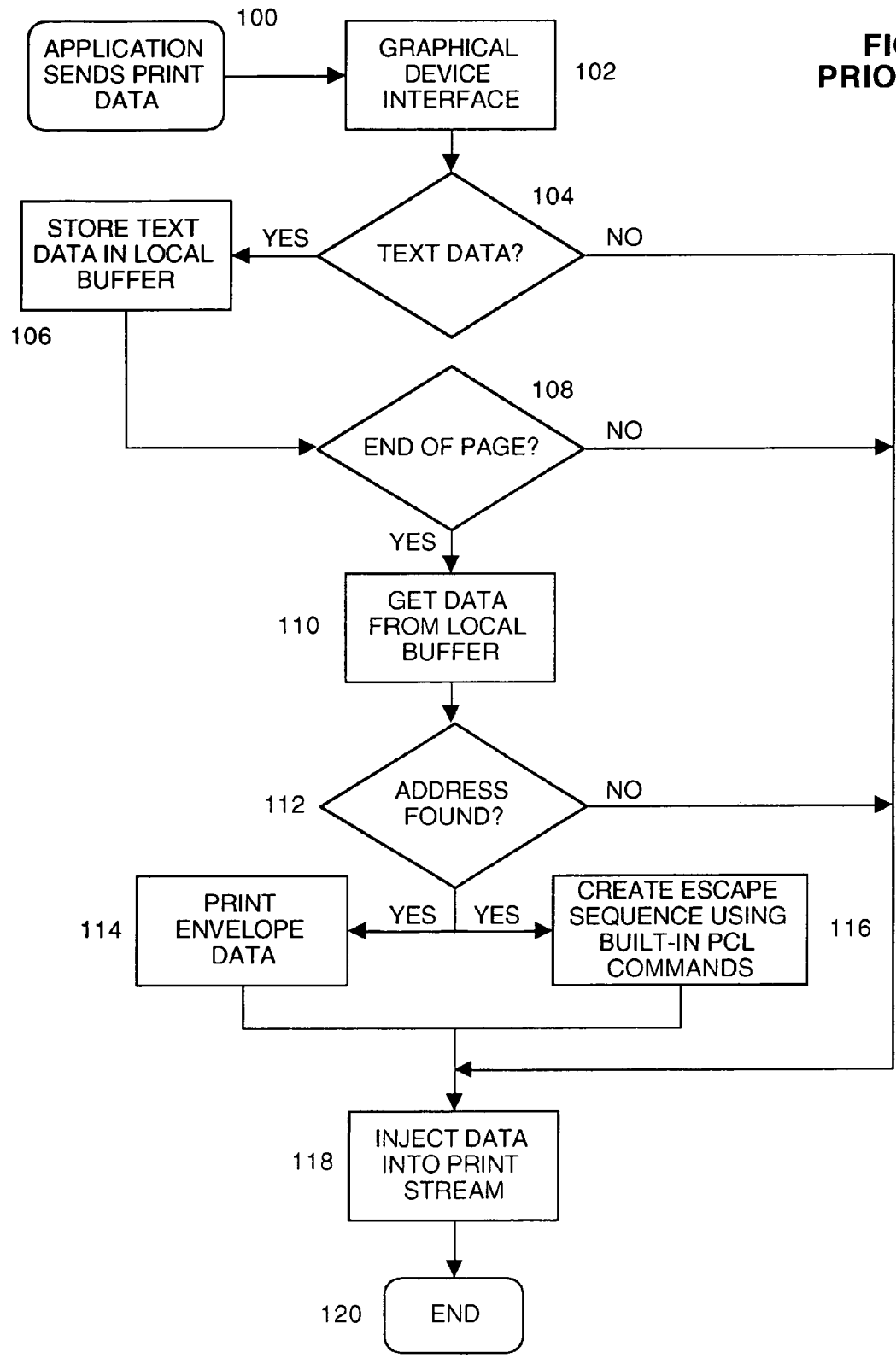
FIG. 2 is a flowchart of the prior art method of printing envelope data extracted from a print stream in a WINDOWS® 95 environment.

Turning to FIG. 2, there is shown a flowchart of the prior art method of printing envelope data extracted from a print stream in a WINDOWS 95 environment.

The prior art method begins at step 100 where a data processing application such as a mailpiece preparation application, operating in a WINDOWS 95 environment, initiates a print stream for each printed document. From step 100, the method advances through a graphical device interface (GDI) at step 102 before entering a document driver module that begins at step 104.

At step 104, the method queries as to whether or not text data has been detected within the print stream. If the response to the query is "NO," then the method proceeds directly to step 118 where the data is re-injected into the print stream before advancing to step 120 where the sequence ends while the print stream is directed toward another peripheral device. If the response to the query at step 104 is "YES," however, then the method advances to step 106 where the text data is stored in a local buffer to await an "end-of-page" control mark from the system.

At step 108, the method queries as to whether or not an end-of-page control mark has been received at the local buffer. If the response to the query is "NO," then the method proceeds directly to step 118 where the data is re-injected into the print stream before advancing to step 120 where the sequence ends while the print stream is directed toward another peripheral device. If the response to the query at step 108 is "YES," however, then the method advances to step 110 where the data is retrieved from the local buffer before advancing to the query at step 112.

At step 112, the method queries as to whether or not an address has been found in the retrieved text. If the response to the query is "NO," then the method proceeds directly to step 118 where the data is re-injected into the print stream before advancing to step 120 where the sequence ends while the print stream is directed toward another peripheral device. If the response to the query at step 112 is "YES," however, then the method advances essentially simultaneously to steps 114 and 116. At step 114, the address data is printed to an envelope as envelope data, while at step 116, an escape sequence is created using built-in printer command language (PCL) commands. Steps 114 and 116 rejoin at step 118 where the data is re-injected into the print stream before advancing to step 120 where the sequence ends while the print stream is directed toward another peripheral device such as a document printer.

Figure 3A:
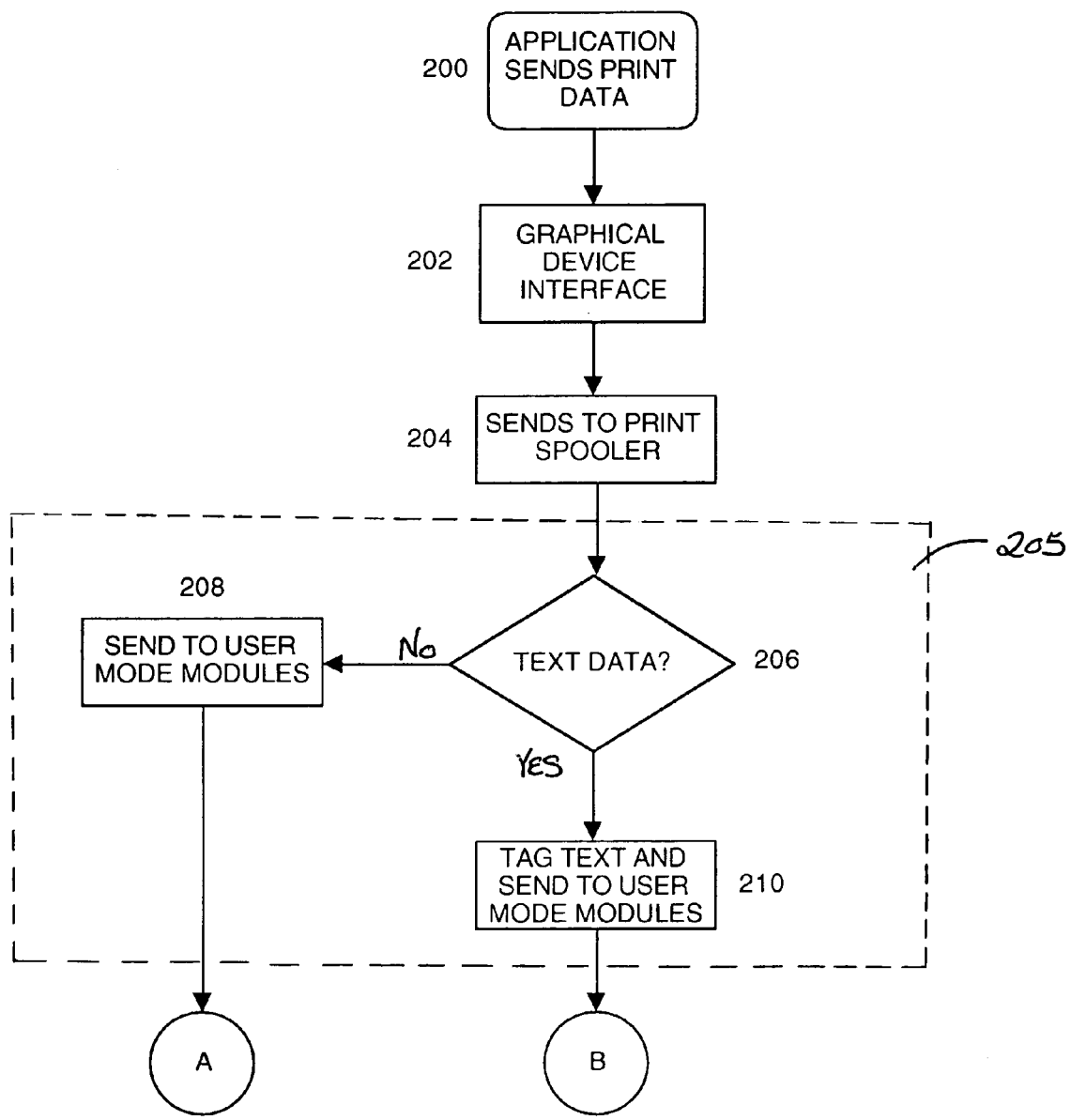
FIG. 3A is a flowchart of the method of the present invention showing the initiation of the print stream and including a document driver kernel.

Next turning to FIG. 3A, there is shown a flowchart of the method of the present invention showing the initiation of the print stream and including a document driver kernel.

The method begins at step 200 where a data processing application such as a mailpiece preparation application, operating in a WINDOWS NT environment, initiates a print stream for each printed document. From step 200, the method advances through a graphical device interface (GDI) at step 202 and sends the print stream to a print spooler at step 204 before entering document driver kernel 205 that begins with a query at step 206. The GDI enables the system printer driver by initiating the query.

At step 206, the method queries as to whether or not text data has been detected within the print stream. If the response to the query is "NO," then the method proceeds to step 208 where the data is sent to the user mode module, via path A to be re-injected into the print stream at step 236 as is shown in FIG. 3B. If the response to the query at step 206 is "YES," however, then the method advances to step 210 where the text data is tagged and sent to the document driver user mode module 225, along path B as is shown in FIG. 3B.

FIG. 3B is a continuation of the flowchart of the method of the present invention beginning with the document driver user mode module 225 and concluding with the re-injection of data into the print stream at step 236.

Turning first to step 212, path B is shown re-entering the method flow and the tagged text data is stored in a local buffer. From step 212, the method advances to the query at step 214. At step 214, the method queries as to whether or not an end-of-page control mark has been received at the local buffer. If the response to the query is "NO," then the method proceeds directly to step 236 where the data is re-injected into the print stream before advancing to step 238 where the sequence ends while the print stream is directed toward another peripheral device. If the response to the query at step 214 is "YES," however, then the method advances to step 216 where the data is retrieved from the local buffer before advancing to the query at step 218.

At step 218, the method queries as to whether or not an address has been found in the retrieved text. If the response to the query is "NO," then the method proceeds directly to step 236 where the data is re-injected into the print stream before advancing to step 238 where the sequence ends while the print stream is directed toward another peripheral device. If the response to the query at step 218 is "YES," however, then the method advances essentially simultaneously to step 220. At step 220, the system creates an envelope printer device context before advancing to step 222. At step 222, the address data is printed to an envelope driver as envelope data.

From step 222, the method advances essentially simultaneously to steps 224 and 228. Step 224 exists as a separate envelope kernel and user mode where an envelope printer device language (PDL) is generated for filing before advancing to step 226 where the envelope print data is placed in a temporary file.

Turning back to step 228, the method queries as to whether or not all the available envelope data for this particular document has been printed. If the response to the query is "NO," then the method returns to re-enter the method flow at step 222 so that the remaining data can be printed. If the response to the query at step 228 is "YES," however, then the method advances to step 230 where the envelope printing is ended. The method then advances to a query at step 232. At step 232, the method queries as to whether or not the system is ready to inject the envelope data back into the print stream. If the response to the query is "NO," then the method returns to re-enter the method flow at step 232 and the query is repeated. If the response to the query at step 232 is "YES," however, then the method advances to step 234 where the envelope PDL data file is read and then injected at step 236 back into the print stream before advancing to step 238 where the sequence ends while the print stream is directed toward another peripheral device such as a document printer.

Figure 4:
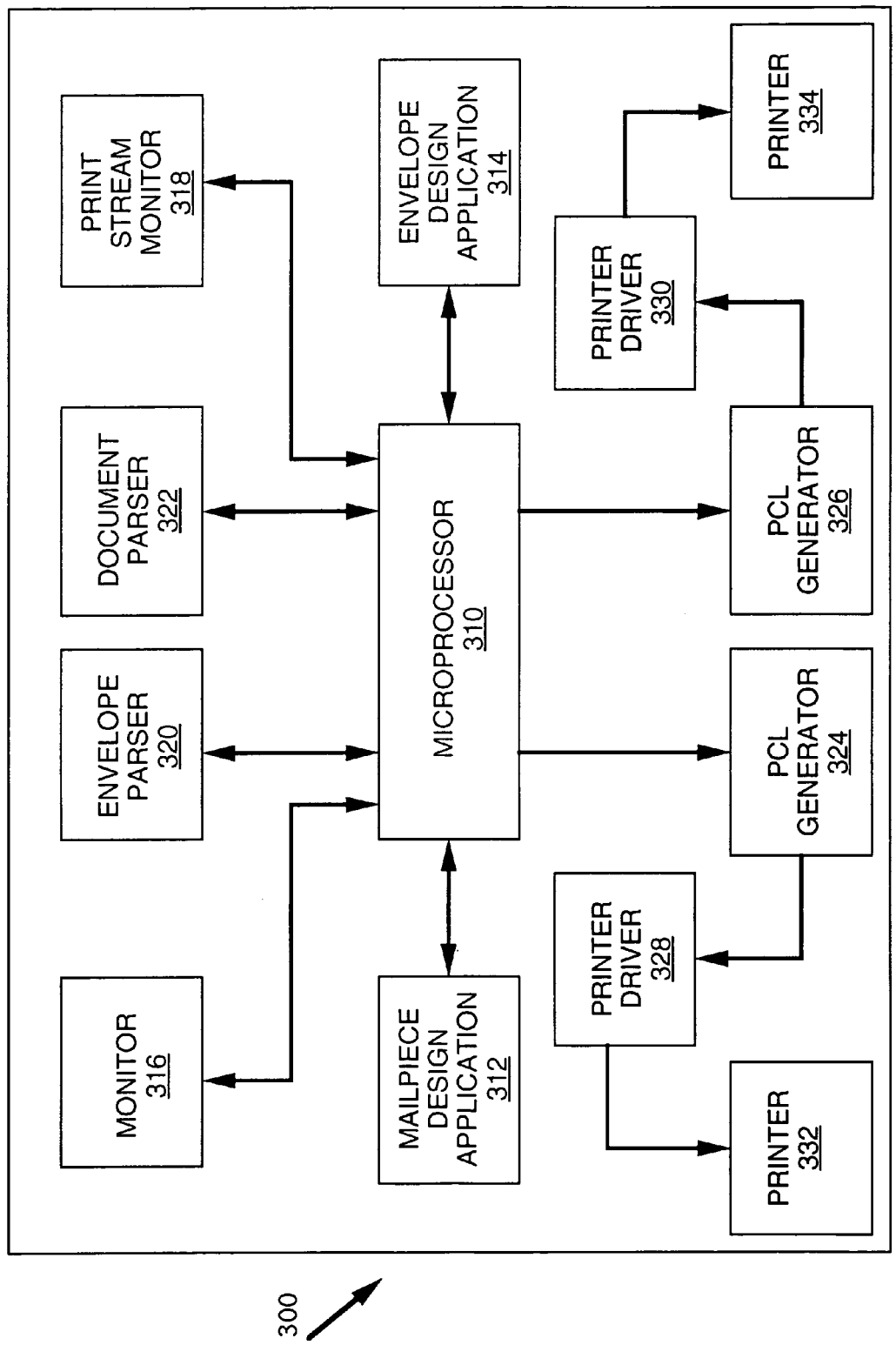
FIG. 4 is a block diagram of the system of the present invention.

FIG. 4 is a block diagram of the system and corresponding components of the present invention.

A microprocessor 310 is shown interoperatively connected to a document design application 312, for preparing a document such as a mailpiece with its associated text insert, to be printed as document text and as envelope text. In a preferred embodiment of the present invention, the document designer application 312 is a 32-bit WINDOWS automation server. The document designer application is capable of creating and/or modifying a mailpiece definition file and storing and/or retrieving one or more mailpiece definition files wherein each of said files corresponds to a specific mail print run and results in a print stream. Also connected to microprocessor 310, is an envelope design application 314.

The envelope design application 314 is utilized for: displaying a set of data fields is of the envelope text data portion to a system user; reading a set of parameters created by the envelope designer application; and, writing the envelope data to a printer driver.

The set of data fields displayed is representative of the face of an envelope (comprising an indicia print field and an addressee print field), thus allowing the system user a convenient way to check on field selection and placement.

Additionally connected to microprocessor 310 is a print stream monitor 318 for: scanning the print stream generated by the mailpiece design application 312; detecting a set of document data or control data and a set of envelope data; interfacing with the envelope parser 320 to extract an address from the document text data; interfacing with the document parser 322 to extract control page information from the print stream; generating the envelope PCL print data at the PCL print generator 324; and, for modifying the print stream to merge the two sets of data. The print stream monitor 318 maintains the system timing during printing of the mailpiece and the general performance of the document print job.

The system includes a document (or control page) parser 322 for detecting, parsing, and then extracting the document data from the print stream, as well as instructing the print stream task manager (not shown). Further included, is an envelope parser 320 for detecting, parsing, and then extracting the envelope data from the print stream and then indicating to the print stream task manager that an address has been detected.

To print the envelope, a PCL generator 324 is connected to the microprocessor 310 for converting the envelope data as extracted from the print stream into a second printer language, thus creating a proper PCL for the envelope text to be printed through printer driver 328 to printer 332 and on to an envelope or similar substrate. To print the document, a PCL generator 326 is connected to the microprocessor 310 for converting the document data as extracted from the print stream into a second printer language, thus creating a proper PCL for the document text to be printed through printer driver 330 to printer 334 and on to one or more sheets or similar substrate. The WINDOWS NT printer architecture requires that every printer driver be implemented as a pair of user mode dynamic link libraries (DLL), as well as a printer specific component.

The WINDOWS NT printing architecture is part of the NT graphics architecture and consists of three components; these are: the applications that interface with the WINDOWS GDI; the server print spooler that interfaces with the print services convention; and, the kernel mode print services that include the printer driver minidriver and the I/O port interface. The print spooler internally accesses the user interface and the user mode printer driver components. The minidriver is a data file that contains the printer data tables as well as code specific to system driver that works in conjunction with the shim common driver. The purpose of the shim common driver is to intercept the raster graphic entry points to obtain print stream data and to provide each of the other drivers with common kernel functions when necessary.

While certain embodiments have been described above in terms of the system within which the method may reside, the invention is not limited to such a context.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method of modifying print stream data in a printing system, said method comprising the steps of:
    (a) sending a print stream from a data processing application to a print spooler;
    (b) determining, in a document driver, whether or not said print stream comprises text data, and:
        (i) if said print stream comprises text data then tagging said text data and sending said tagged text data to a user mode module for further parsing; or
        (ii) if said print stream does not comprise text data then sending said print stream to a direct data injection step for a document printer;
    (c) storing said tagged text in a local buffer;
    (d) retrieving said tagged text from said local buffer and determining whether or not an address is contained within said tagged text, and:
        (i) if an address is found in said tagged text, then placing said address in an envelope print format to create an envelope data set; and
        (ii) if an address is not found then sending said tagged text directly to said data injection step;
    (e) creating an envelope printer device context from the document driver and transmitting said envelope data set to an envelope printer driver for creating an envelope printer device language file;
    (f) reading said printer device language and then injecting said envelope data set into said print stream so that the envelope data may be transmitted to the envelope printer and the document data to the document printer; and
    (g) transmitting said print stream to a next destination.

2. The method of claim 1, wherein said print stream is passed through a graphical device interface (GDI) when being sent from said data processing application to said print spooler to form a GDI print stream.

3. The method of claim 1, wherein said print stream comprises control data.

4. The method of claim 1, wherein said local buffer stores said tagged text until at least one end-of-page control mark is received in said local buffer.

5. The method of claim 1, wherein said tagged text stored in said local buffer cannot be retrieved until said stored tagged text has received an end of page control mark for said stored tagged text sought to be retrieved.

6. The method of claim 1, wherein said data processing application is a mailpiece designer application.

7. The method of claim 6, wherein said mailpiece designer application is capable of presenting a data entry screen to a system user for performing the further steps of;

(a) creating and/or modifying a mailpiece definition file; and (b) storing and/or retrieving one or more mailpiece definition files wherein each of said files corresponds to a specific mail print run.

8. The method of claim 1, wherein said print stream comprises a control page wizard.

9. The method of claim 8, wherein said control page wizard is utilized to facilitate mail merge functionality within said printing system.

10. The method of claim 2, wherein said GDI print stream is converted by a document printer command language (PCL) generator into an envelope printer language.

* * * * *